June 25, 1968
D. N. MILLER
3,389,960
PROCESS FOR PRODUCING STRONG NITRIC ACID
Filed Aug. 31, 1964
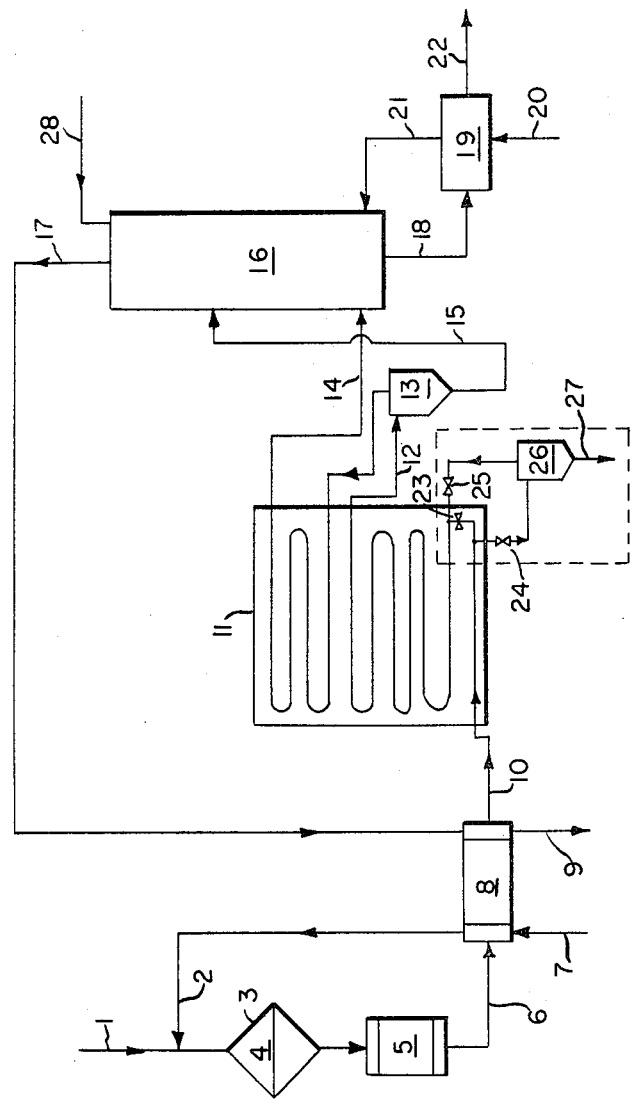
INVENTOR
DONALD N. MILLER
BY *[signature]*
ATTORNEY United States Patent Office 3,389,960
Patented June 25, 1968

3,389,960
PROCESS FOR PRODUCING STRONG
NITRIC ACID
Donald N. Miller, Wilmington, Del., assignor to E. I. du
Pont de Nemours and Company, Wilmington, Del., a
corporation of Delaware
Filed Aug. 31, 1964, Ser. No. 393,065
6 Claims. (Cl. 23—160)

ABSTRACT OF THE DISCLOSURE

Nitric acid containing at least 63% $HNO_3$ by weight is produced in a modified pressure process wherein water in the form of weak acid condensate is withdrawn from the cooler-condenser in two stages. First stage withdrawal is of aqueous nitric acid having a concentration of about from 1 to 45%, by weight, and the second stage comprises removal of stronger weak acid than is removed in the first stage.

---

The manufacture of nitric acid by catalytic oxidation of ammonia is well established and broadly practiced in the chemical industry. Many variations in nitric acid processes are operated, and are distinguished by the characteristic conditions of the oxidation of ammonia and absorption of the oxides to produce nitric acid, and by the concentration or strength of the nitric acid which is produced. These processes are known by such titles as atmospheric process, pressure process, Montecatini process, Bamag-Meguin process, etc. Pressure process plants are those in which both oxidation of ammonia and absorption of oxides are carried out under superatmospheric pressure, generally in the range of 50 to 125 p.s.i.g. A survey of nitric acid plants in the United States as of 1957 (Chemical Engineering Progress Monograph Series, No. 3, volume 56 (1960)) showed that over 62% of the installed capacity for the manufacture of nitric acid in the United States was operated according to the pressure process. These plants as well as pressure process plants constructed more recently produce nitric acid of a concentration not greater than about 62% and generally in the range of about 50 to 60% strength.

In recent years, considerable progress has been made in increasing the size and improving both the thermal and the economic efficiency of pressure process nitric acid plants so that plants of recent construction are thermally self-sufficient, and on balance may even be net producers of energy, usually in the form of steam, which can be utilized in other nearby operations outside the nitric acid-manufacturing plant. But the standard product of these more economical, larger, modern, thermally self-sufficient, pressure process nitric acid plants has continued to be nitric acid of strengths up to but not exceeding about 62% concentration, by weight.

For the purposes of this invention, strong nitric acid means an aqueous solution containing at least 63% by weight of $HNO_3$, and weak nitric acid has a concentration less than 63% by weight of $HNO_3$.

Many advantages will accrue if strong nitric acid can be produced in the existing pressure process plants without making large additional investment in facilities or incurring economic penalties in operation thereof. Such potential benefits are readily apparent. Thus, even shipping costs for nitric acid, based on the gross weight thereof, will be reduced if a stronger acid is produced for shipment. Fertilizer manufacturing processes that use nitric acid can be improved by the use of more concentrated acid. In the manufacture of the so-called mixed acids (i.e., nitric and sulfuric acid mixtures used in nitration operations), less of concentrated or fuming sulfuric acid is required to obtain the proper water balance in the mixed acid if a strong nitric acid is available for use in preparing said mixed acids. Much nitric acid is used at concentrations of 95% by weight, or more. Acids of this concentration can be produced directly by more costly processes, but generally are produced most economically by a separate nitric acid concentrating operation on feed of dilute nitric acid from a pressure nitric acid plant. Said concentration requires extractive distillation of weak nitric acid in the presence of a third component, such as sulfuric acid or magnesium nitrate, which acts as a dehydrating agent. Obviously, less of the dehydrating agent will be required if the nitric acid feed to the process is stronger than 63% by weight.

The prior art has recognized that direct production of strong nitric acid is desirable, i.e., making strong nitric acid without having to take unusual or supplementary concentration steps to remove water from the 50–60% strength acid generally produced heretofore in standard pressure process nitric acid plants. Such direct production of strong nitric acid, however, has been achieved only by selectively condensing steam or very dilute nitric acid from the ammonia oxidation products by use of refrigerated cooling, removing part of the condensate from the system and then employing intensive cooling or relatively high pressures in the absorption column to produce strong nitric acid. Thus, U.S. Patent No. 1,735,342 discloses that partial condensation of pressure process ammonia oxidation gases separates a considerable portion of water, some of which may be discarded and the remainder used for the absorption of nitrogen oxides to make 70% or stronger nitric acid providing, however, that cooling of the ammonia oxidation products is carried out rapidly and the temperature of the cooled oxidation gases is 20° C. or below, preferably 0° C. Provision is made for mechanical refrigeration to assist in the cooling. U.S. Patent No. 2,046,162 discloses that at an operating pressure of 10 atmospheres it is possible to produce nitric acid as strong as 65%, and that at 20 to 100 atmospheres pressure, nitric acid of greater than 80% strength can be made. The strong nitric acid is attainable, however, only if operating pressures are increased considerably above the levels for which pressure plants have been designed, i.e., about 90–125 p.s.i. for oxidation and about 60–100 p.s.i. for absorption units.

Accordingly, it is an object of this invention to provide a continuous process for making strong nitric acid directly in a pressure process plant without having to provide extensive special equipment such as mechanical refrigeration facilities, or unusually heavy equipment which is required for safe operation at the elevated pressures heretofore disclosed. In short, it is an objective to produce such strong nitric acid when making use of cooling means and operating pressures which are conventional to operation of a pressure process nitric acid plant.

These and other objectives are attained by the present invention which provides a continuous pressure process for the manufacture of strong nitric acid, said process, generally described, comprising continuously:

(a) Reacting a gaseous mixture consisting essentially of ammonia, molecular oxygen, and inert diluents under a pressure of about 90 to 125 p.s.i.g. and in contact with a platinum-containing metal catalyst to form a gaseous stream including nitrogen oxides and water;

(b) Cooling said gaseous stream to a temperature above the dew-point of said stream at said pressure for recovery of heat values;

(c) Further cooling said gaseous stream to form aqueous nitric acid containing about from 1 to 45% by weight of nitric acid;

(d) Separating said aqueous nitric acid from gaseous components;

(e) Further cooling gaseous components from step (d) to a temperature of about 5 to 60° C. to form aqueous nitric acid having a concentration of from about 40 to 63% by weight.;

(f) Separating said aqueous nitric acid of step (e) from residual gases;

(g) Introducing said residual gases from step (f), together with a co-current gaseous stream including molecular oxygen, in mixing relationship therewith, into the lower zone of an absorption column in contact with down-coming strong nitric acid;

(h) Adding aqueous nitric acid of step (f) to an intermediate zone of said absorption column;

(i) Introducing water into said absorption column above said intermediate zone in such amount that the ratio by weight of water to ammonia oxidized in step (a) does not exceed 2.7;

(j) Passing said mixture of gases from step (g) through said absorption column counter-current to a descending flow of nitric acid formed by contacting in mass-exchange relationship said ascending mixture of gases with said descending aqueous stream, the pressure in said column being about 60 to 100 p.s.i.g.; and (k) Removing strong nitric acid from the lower zone of said absorption column.

The operation of the process of this invention may be carried out in the manner described below and illustrated by the accompanying drawing. The attached single figure illustrates in diagrammatic form both the standard pressure process, generally designated in the industry as the Du Pont process, for the manufacture of nitric acid which generally has a concentration of about 50–60% $HNO_3$ by weight, and the improved process of the present invention which, with only the minor modification of equipment shown in the dotted enclosure on the figure, permits direct production of strong nitric acid, i.e., acid which has a concentration of at least 63% by weight, without employing supplementary refrigeration, super pressures, fractional distillation, or other supplementary concentrating steps.

Referring now to the attached figure, in the standard pressure process for manufacturing nitric acid, ammonia vapor flows through line 1 in the direction indicated by the arrow and is mixed with preheated air which enters through line 7, heat exchanger 8 and line 2. The mixture of air and ammonia at a pressure of about 90 to 125, preferably 100–110, pounds per square inch gage (p.s.i.g.) and a temperature of about from 230 to 300° C. flows to the ammonia oxidation unit 3 and and through platinum or platinum alloy catalyst 4 in the usual manner. An excess of air is used, beyond that stoichiometrically required to convert ammonia to nitric oxide and water, so the gases from the converter 3 includes oxides of nitrogen, steam, oxygen, nitrogen, and other inert material and have a temperature about from 900 to 1050° C. The gases from converter 3 pass through steam-generating heat-recovery unit 5, and through heat exchanger 8 wherein the compressed air supply entering at line 7 and the absorption column offgas from line 17 are heated to the desired temperature. The partially cooled gas from heat exchanger 8 at a temperature of about from 150° to 450° C. passes through line 10 and enters water-cooled cooler-condenser 11 (not having the auxiliary parts 23 to 27, inclusive) wherein the temperature of the gas stream is further reduced, condensation of water takes place, and dilute nitric acid is formed. The stream of gas and liquid leaves cooler-condenser 11 via line 12 and enters separator 13 in which dilute nitric acid at a temperature of about from 5 to 60° C. and containing from about 40% to 58% by weight of $HNO_3$ is separated from the residual gases. Said liquid portion collected in separator 13 is fed through line 15 into absorption column 16 at such a location that the concentration of the incoming liquid is not less than that of the fluid at that location in the column. In the figure, line 12 is shown to leave cooler-condenser 11 at a point representing the 4th pass of product stream through the hairpin-bend-coils of cooler-condenser 11. The take-off for line 12, however, may be at any location on the cooler-condenser but preferably will be at such a point that substantially all vapors condensible at 40° C. are in the liquid form and can be removed from the gaseous stream in separator 13. The function of separator 13, alternatively, may be served by more than one separator in which case a corresponding number of gas and fluid streams will be sent back to cooler-condenser 11 and to column 16, respectively. Cooler-condenser 11 may be of the usual cascade design well known in the art, or may consist of other types of heat exchangers such as a shell and tube condenser which is supplied with cooling water from any conventional source. Absorption column 16 may be a packed column, or column of other design, but conventionally is a bubble plate absorption column in which the liquid stream 15 is fed to a suitable intermediate plate of the column. The cooled residual gas from separator 13, which contains NO, $NO_2$, $N_2O$, and $N_2$ and other inerts, may be sent directly into column 16 or passed again back to and through a portion of cooler-condenser 11 and line 14 into the bottom section of absorption column 16 where the gas is mixed with air entering from line 20 via bleacher 19 and line 21. The gaseous stream leaving cooler-condenser 11 may be further cooled to increase $NO_2$ concentration i.e., to promote the state of oxidation, before entering column 16. The mixed gases pass upward through absorption column 16, countercurrent to the descending flow of nitric acid entering from line 15 and water entering the top of the column through line 28. Unabsorbed gases under a pressure of about from 60 to 100 p.s.i.g. pass overhead from column 16 through line 17, to heat exchanger 8, and then through line 9 to a power recovery unit not shown in the figure.

The nitric acid effluent from column 16 passes through line 18 into bleacher 19 where it moves countercurrently to air entering through line 20 and exiting through line 21 to column 16, as heretofore described. The air entering through line 20 removes small quantities of $NO_2$ dissolved in the acid entering though line 18 and carries them to column 16 where they are converted to nitric acid.

The bleached or decolorized product acid from 19 is removed through line 22, and contains about 60% $HNO_3$ by weight, but may range from about 50 to 63% nitric acid. Bleaching of product acid, as in bleacher 19, can be accomplished in a lower section of column 16 below the plate level at which line 14 enters the column, but preferably is carried out in a separate reacting vessel 19 as shown in the figure.

To accomplish the process of the instant invention, the standard processing equipment is modified as shown in the dotted enclosure in the attached figure. Said modification comprises installation of gas-liquid separator 26 so that the gases entering through line 10 and passing through a portion, for example one pass of one coil, of cooler-condenser 11 are partially condensed and are diverted through valve 24 to separator 26 wherein the liquid portion of the fluid stream is separated and the gaseous portion passes overhead through valve 25 and back to cooler-condenser 11. These gases are further cooled and partially condensed in cooler-condenser 11 and then passed to separator 13 wherein aqueous nitric acid of about from 40 to 63% concentration is separated from the fluid stream and passed through line 15 to an intermediate zone of column 16. The gaseous portion of the fluid stream passes overhead from separator 13 back to cooler-condenser 11 and ultimately through line 14 to column 16 as in standard operation.

Valve 23 is closed and valves 24 and 25 are open during operation of the process of the present invention, and said positions of valves 23, 24, and 25 are reversed for operation of the standard pressure process nitric acid manufacturing operation heretofore described. Valve 24 and associated valves 23 and 25, or other suitable means of redirecting the fluids flow from cooler-condenser 11 through separator 26, are provided to permit removal of relatively water-rich condensate from the stream of ammonia oxidation products and return of the gaseous portion of the stream to the cooler-condenser assembly. The location of valve 24 is so chosen and the flow of cooling water is so controlled that the temperature of the liquid in the cooler-condenser at valve 24 is about from 10 to 65° C. below the dew point of the gas stream which enters the cooler-condenser from line 10, which will give a temperature of about from 25 to 95° C. for the liquid at valve 24.

Heat is removed from cooler-condenser 11 by water obtained from conventional sources of supply such as river water, lake water, well water, spray ponds, and the like. The temperature of a surface water supply, for example such as from a river, varies appreciably during the course of a year. In winter time when water temperatures drop to about 5° C. or even below, less water is required for satisfactory performance of the cooler-condenser 11, but even in the middle of the summer when the temperature of the surface water supply reaches or even exceeds 30° C., the process of the invention is effectively accomplished without the necessity of employing refrigeration, as disclosed in the prior art, to remove water selectively in the form of dilute nitric acid in stream 27. This is a feature characteristic of the instant invention not hitherto disclosed or employed in the manufacture of strong nitric acid in pressure process nitric acid plants.

The condensate collected in separator 26 in the process of the instant invention is dilute aqueous nitric acid containing up to about 45% $HNO_3$. This dilute nitric acid is removed through line 27 and may be used in carrying out neutralizations, acidifications, and many oxidation reactions accomplished with nitric acid, where said dilute acid may, in fact, be preferred, as for example in the oxidation of p-xylene to terephthalic acid as described in U.S. Patent No. 2,636,899.

Because a substantial portion of water entering cooler-condenser 11 in the practice of the process of the present invention is removed through line 27 as weak nitric acid, the fluid leaving cooler-condenser 11 through line 12 contains a lower proportion of water and a higher proportion of oxygen and oxides of nitrogen than is contained in the fluid obtained by the standard nitric acid manufacturing process of the known art. As a consequence, a lower proportion of the oxygen and oxides of nitrogen in line 12 are removed through line 15, and the gaseous stream entering column 16 through line 14 contains higher percentages of nitrogen oxides and oxygen than are obtained in the standard process. Said enriched process stream entering column 16 makes possible the manufacture of nitric acid of from 63 to about 76% concentration by weight which leaves the process through line 22 instead of acid of about 60–62% concentration produced by the standard process of the known art.

The process of the present invention as described hereinabove is exemplified in Table IA which shows for operation of the process over a range of practical conditions, materials flow in significant process streams, both as to amount per hour and composition thereof, in comparison with corresponding data for the standard process.

Example 1 in Table IA shows the results obtained in operation of the standard process wherein all of the nitric acid produced (stream 22) is of 60.1% strength by weight; Example 2 shows a corresponding run by the process of this invention in which the strong nitric acid is of 63.1% strength, the weak nitric acid is of 27.2% strength, and the total amount of acid produced with reference to the weight of ammonia consumed is substantially the same as is obtained by operating the process in the standard manner heretofore known, i.e., no yield is sacrificed by producing the same amount of nitric acid (100% basis) in two streams, one of which is strong nitric acid.

Similarly, Examples 3, 5, and 7 of Table IA are to be compared, respectively, with Examples 4, 6, and 8. For each pair of examples it is apparent that operation according to the process of the invention (Examples 4, 6, and 8) gives a product stream (22) appreciably higher in nitric acid concentration than is obtained for a corresponding ammonia feed rate in the standard process (Examples 3, 5, and 7).

Examples 9 to 14, inclusive, of Table IB further exemplify the process of the invention; strong nitric acid of concentrations ranging from 63 to above 70% by weight being produced at the usual operating pressure without sacrificing yield of nitric acid from the ammonia fed to the converter 3 and without requiring supplementary cooling beyond that available from the conventional supplies of cooling water.

The equipment used in each example of the invention process in Table 1 is the modified apparatus shown in the figure, employing a conventional six-pass hairpin cooler-condenser in a 55 ton/day nitric acid plant, operating at a converter pressure of 105 p.s.i.g., and a 35-plate absorption column operating at a pressure of 60 to 90 p.s.i.g. The temperature of the aqueous nitric acid at separator 13 is in the range of 20 to 60° C. in each instance.

The amounts and ratios of ammonia and oxygen-containing gas (i.e., air) used in the process are conventional in nitric acid manufacture by the pressure process and are not critical for the process of the invention, but an air to ammonia ratio of 15.5 to 16.5 lb./lb. is preferred. The amount of water introduced through line 28 is adjusted in accordance with process requirements, but in no case is it greater than 2.7 lb. of water per pound of ammonia burned in converter 3. Part or all of the water

| Example | Table 1A | | | | | | | | Table 1B | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| STREAM | | | | | | | | | | | | | | |
| $NH_3$ feed (1), lb./hr | 1,613 | 1,628 | 1,480 | 1,494 | 1,119 | 1,227 | 1,390 | 1,393 | 1,547 | 1,530 | 1,638 | 1,208 | 1,462 | 1,464 |
| Air (2)/$NH_3$ (1), lb./lb | 14.27 | 14.32 | 16.00 | 15.94 | 15.80 | 16.00 | 15.94 | 15.92 | 16.27 | 16.27 | 16.27 | 16.03 | 16.25 | 16.25 |
| Condensate (15), lb./hr | 4,893 | 1,977 | 4,626 | 1,980 | 3,440 | 881 | 4,400 | 1,343 | 2,400 | 2,081 | 1,800 | 921 | 1,560 | 1,560 |
| Condensate (15), percent $HNO_3$ | 52.3 | 57.2 | 55.7 | 59.8 | 56.5 | 63.0 | 55.6 | 60.0 | 58.9 | 59.9 | 59.2 | 60.1 | 60.3 | 60.0 |
| Condensate (15), percent $NO_2$ | 2.8 | 4.0 | 1.7 | 2.9 | 2.5 | 4.0 | 2.8 | 4.0 | 2.7 | 2.8 | 3.3 | 7.2 | 4.9 | 4.5 |
| $H_2O$ feed (28), lb./hr | 1,870 | 2,590 | 1,400 | 2,080 | 1,160 | 1,650 | 1,290 | 1,890 | 2,290 | 2,190 | 2,450 | 1,393 | 1,000 | 1,000 |
| $H_2O$ (28)/$NH_3$ (1), lb./lb | 1.16 | 1.59 | 0.95 | 1.39 | 1.04 | 1.35 | 0.93 | 1.35 | 1.48 | 1.43 | 1.50 | 1.15 | 0.68 | 0.68 |
| Product $HNO_3$ (22), lb./hr | 9,010 | 7,670 | 8,030 | 6,720 | 6,180 | 4,850 | 7,620 | 6,020 | 7,490 | 7,100 | 7,510 | 4,448 | 7,629 | 7,653 |
| Product $HNO_3$ (22), percent $HNO_3$ | 60.1 | 63.1 | 62.0 | 65.1 | 62.6 | 67.4 | 62.7 | 66.4 | 63.4 | 64.6 | 65.5 | 70.3 | 65.7 | 65.5 |
| Product $HNO_3$ (22), percent $NO_2$ | 0.02 | 0.01 | 0.2 | 0.4 | 0.2 | 0.6 | 0.7 | 1.8 | 0.1 | 0.3 | 0.2 | 0.01 | 0.6 | 0.6 |
| Fluid (24), Temp, °C | | 72 | | 74 | | 56 | | 74 | 80 | 73 | 72 | 52 | 65 | 65 |
| Condensate (27), lb./hr | 0 | 2,257 | 0 | 2,069 | 0 | 2,208 | 0 | 2,225 | 1,791 | 2,040 | 2,308 | [3] 2,400 | [3] 2,400 | [3] 2,400 |
| Condensate (27), percent $HNO_3$ | 0 | 27.2 | 0 | 29.8 | 0 | 38.9 | 0 | 32.0 | 29.1 | 29.5 | 30.3 | 39.5 | 33.8 | 33.5 |
| Condensate (27), percent $NO_2$ | 0 | 0.9 | 0 | 0.8 | 0 | 0.6 | 0 | 1.0 | 0.4 | 0.6 | 1.0 | 0.2 | 1.0 | 0.2 |
| Total $HNO_3$ made, lb./hr. [100 percent basis: (22)+(27)] | 5,420 | 5,480 | 5,010 | 5,060 | 3,890 | 4,190 | 4,780 | 4,740 | 5,300 | 5,240 | 5,680 | 3,120 | 5,075 | 5,075 |
| $HNO_3$/$NH_4$, lb./lb | 3.4 | 3.4 | 3.4 | 3.4 | 3.4 | 3.4 | 3.4 | 3.4 | 3.4 | 3.4 | 3.4 | 3.4 | 3.5 | 3.5 |
| Gas stream (14), lb./hr | 19,740 | 20,710 | 20,530 | 21,350 | 15,360 | 17,770 | 19,150 | 20,000 | 22,530 | 22,300 | 24,180 | 17,300 | 21,260 | 21,300 |
| Equiv. NO, percent by vol.[3] | 6.46 | 8.15 | 5.47 | 7.23 | 5.55 | 7.17 | 5.47 | 7.45 | 6.83 | 6.95 | 7.50 | 7.03 | 7.03 | 7.11 |
| Equiv. $O_2$, percent by vol.[3] | 2.85 | 4.24 | 4.71 | 5.88 | 4.40 | 5.97 | 4.58 | 5.88 | 5.96 | 6.05 | 6.24 | 5.70 | 5.96 | 6.02 |

[1] Equiv. NO = (volume percent NO + $NO_2$).
[2] Equiv. $O_2$ = (volume percent $O_2$ + ½$NO_2$).
[3] In Examples 13 and 14, stream 27 is fed to column 16 rather than being isolated.
( ) Refers to numbered process stream in the figure.

supplied through line 28 to the upper plates of absorption column 16, Table 1, may be in the form of weak nitric acid, or weak nitric acid or water may be introduced earlier in the process as described in more detail hereinbelow. The water added to the process stream, whatever its source, will not exceed 2.7 lb. of water per pound of ammonia burned in converter 3.

In the process of this invention, nitric acid usually is produced in two streams, one of weak nitric acid and one of strong nitric acid. It is believed that the manufacture of strong nitric acid by the process of this invention is achieved because the feed gas to absorption column 16 through line 14 is relatively enriched in nitrogen oxides and in oxygen content, as compared with the gases delivered to column 16 in the standard pressure process. The enrichment of stream 14 in equivalent NO and equivalent $O_2$ is illustrated in Table 2, below, which contains data taken from Table 1A for the pairs of corresponding runs by the standard process and the process of

TABLE 2.—COMPOSITION OF STREAM 14

| Standard Process | | | Process of this Invention | | |
|---|---|---|---|---|---|
| Example | Equivalent, percent by volume | | Example | Equivalent, percent by volume | |
| | NO | $O_2$ | | NO | $O_2$ |
| 1 | 6.46 | 2.38 | 2 | 8.15 | 4.24 |
| 3 | 5.47 | 4.71 | 4 | 7.13 | 5.88 |
| 5 | 5.55 | 4.40 | 6 | 7.17 | 5.97 |
| 7 | 5.47 | 4.58 | 8 | 7.45 | 5.88 |

Gas stream 14 contains $NO_2$ as well as NO and $O_2$, the composition of the stream being affected by its history up to the time the stream enters column 16. In order to put each stream composition on a basis suitable for comparison with streams from other runs, as in Table 2 above, the analyzed compositions of the streams are recalculated to express all of the combined nitrogen as equivalent NO (i.e., volume percent of $NO+NO_2$) and the oxygen as equivalent oxygen (i.e., volume percent of $O_2+\frac{1}{2}NO_2$) even though partial conversion of NO to $NO_2$, with corresponding consumption of $O_2$, has taken place. It is apparent from the data in Table 2 that the concentration of nitrogen oxides in stream 14 is about 25–40% higher for the process of the invention than for the standard process.

The process of the invention has been fully described and exemplified above. It will be apparent, however, that many modifications of this invention are possible without departing from the spirit and or scope thereof. Such modifications provide a desirable degree of flexibility and may be practiced in order to take advantage of prevailing conditions peculiar to a given plant installation, or to capitalize on economic advantages which can be realized by introducing said variations in the process.

In one effective alternate mode of carrying out the process of this invention, the air entering through line 2 is mixed with gaseous oxygen; and according to another alternative, the air entering through line 2 is displaced entirely by gaseous oxygen. In both alternatives, steam may be added to the mixture entering the converter 3 in order to avoid explosions of the ammonia-oxygen mixture and to assist in controlling the temperature of the catalyst bed 4 and the reaction mixture leaving the catalyst bed to enter waste heat boiler 5.

In a preferred embodiment of the invention, as shown schematically in the appended figure, facilities are employed which permit effective recovery of energy values, such as steam generators, process air preheaters, and off-gas reheaters used in conjunction with reciprocating or centrifugal power recovery engines. Other combinations of energy-recovery units may be used effectively, or some of the units shown in the figure may be omitted, energy recovery being accomplished at other stages of the process. Thus, steam-generating heat-recovery unit 5 may be omitted; heat-exchanger 8 shown in the figure as a single unit for heating both gas streams 7 and 17 may be displaced by two heat exchange units, one for each of the gas streams 7 and 17; gas stream 17 may by-pass a heat exchanger completely; or a heat exchanger may be introduced into line 10 to precool gas in line 10 without causing condensation of any of the components of said gas stream before it enters cooler-condenser 11. All of these variations are within the scope of the process of the invention, their use being governed largely by the effects on the overall economy of the nitric acid manufacturing process.

Supplementary air introduced through line 20 for bleaching the strong nitric acid from column 16 and completing the oxidation of NO to form nitric acid in column 16 alternatively may be introduced at any point in the system between valve 25 and column 16; or oxygen may be used in place of, or as a supplement to, air supply entering the system between valve 25 and line 20. If strong nitric acid containing oxides of nitrogen is to be the product of manufacture, then bleaching in tank 19 is omitted entirely, the requisite oxygen being introduced at other points downstream of valve 25, as indicated above.

As exemplified hereinbefore, a preferred embodiment of the process of the invention is effective in producing strong nitric acid at line 22 and weak nitric acid at line 27. Alternatively, all of the nitric acid produced by the process of the invention may be obtained in the form of strong nitric acid by returning the weak nitric acid of line 27 to a suitable location in column 16 above the point at which the liquid from line 15 enters said column, preferably at a point in the column where the column liquid is of approximately the same nitric acid concentration as is the liquid of line 27. This procedure is followed in Example 13 of Table 1B. Said condensate liquid of line 27, instead of being returned to column 16 at a location between the point of entry of line 15 and the top of the column, may be added at the top of the column with water from line 28 as in Example 14 of Table 1B, and as a further alternative may be added at the top of the column in place of water from line 28. If weak nitric acid of line 27 is fed to column 16, instead of being withdrawn from the process as such, then the amount of water fed through line 28 will be correspondingly reduced as hereinbefore specified, i.e., the amount of water in pounds per hour added to column 16 through line 28 will be reduced by an amount at least equal to that in pounds per hour which is added from line 27. In no case will the water introduced to column 16 exceed 2.7 pounds per pound of ammonia burned in converter 3. Under conditions in which dilute nitric acid of line 27 is fed to the top of absorption column 16, the off-gases through line 17 may be slightly richer in oxides of nitrogen than when some water is added to the top plate of column 16 and said dilute nitric acid of line 27 is returned at a point between the top plate of column 16 and the plate at which liquid enters column 16 through line 15. As indicated previously, the overall economics of the process, including the costs of off-gas disposal, usually will dictate which of the several alternative modes of operation is to be used in the manufacture of strong nitric acid by the process of the invention.

I claim:
1. A process for the manufacture of strong nitric acid which comprises, in combination, continuously:
   (a) reacting a gaseous mixture consisting essentially of ammonia, molecular oxygen and inert diluents under a pressure of about from 90 to 125 p.s.i.g. and in contact with a platinum-containing catalyst to form a gaseous stream including nitrogen oxides and water;
   (b) cooling said gaseous stream to a temperature above the dew point of said stream at said pressure for recovery of heat values;
   (c) further cooling said gaseous stream to form aqueous nitric acid containing about from 1 to 45% by weight of nitric acid;

(d) separating said aqueous nitric from gaseous components;

(e) further cooling gaseous components from step (d) to a temperature of about 5 to 60° C. to form aqueous nitric acid having a concentration about from 40 to 63% by weight;

(f) separating said aqueous nitric acid of step (e) from residual gases;

(g) introducing said residual gases from step (f), together with a cocurrent gaseous stream including molecular oxygen, in mixing relationship therewith, into the lower zone of an absorption column in contact with downcoming strong nitric acid;

(h) adding the aqueous nitric acid of step (f) to an intermediate zone of said absorption column;

(i) introducing water into said absorption column above said intermediate zone in such amount that the ratio by weight of water to ammonia oxidized in step (a) does not exceed 2.7;

(j) passing said mixture of gases from step (g) through said absorption column countercurrent to a descending flow of aqueous nitric acid formed by contacting in mass-exchange relationship said ascending mixture of gases with said descending aqueous stream, the pressure in said column being about from 60 to 100 p.s.i.g.; and (k) removing strong nitric acid from the lower zone of said absorption column.

2. The process of claim 1 wherein the gaseous mixture of step (a) consists of ammonia and air.

3. The process of claim 1 wherein the aqueous nitric acid of step (d) is fed continuously to a zone of the absorption column where the column acid is of about the same concentration, said zone being above the point where step (h) is effected.

4. The process of claim 1 wherein the oxygen-containing gaseous stream of step (g) is air.

5. The process of claim 1 wherein the water of step (i) is introduced as weak nitric acid.

6. A process for the manufacture of strong nitric acid which comprises, in combination, continuously:

(a) reacting a gaseous mixture of air and ammonia having a ratio of air to ammonia, by weight, of about 15.5 to 16.5 at a pressure of about 100 to 110 p.s.i.g. in contact with a platinum-rhodium alloy catalyst to form a gaseous stream including nitrogen oxides and water;

(b) cooling said gaseous stream to a temperature above the dew point of said stream at said pressure for recovery of heat values;

(c) further cooling said gaseous stream to form aqueous nitric acid at a temperature of about from 25 to 95° C. and containing about from 1 to 45% nitric acid, by weight;

(d) separating said aqueous nitric acid from gaseous components;

(e) further cooling gaseous components from step (d) to a temperature of about from 20 to 60° C. to form aqueous nitric acid containing about from 40 to 63% $HNO_3$ by weight;

(f) separating aqueous nitric acid formed in step (e) from the residual gases;

(g) introducing said residual gases from step (f) together with a cocurrent stream of air, in mixing relationship therewith, into the lower zone of an absorption column in contact with downcoming strong nitric acid;

(h) adding the aqueous acid of step (f) to an intermediate zone of said absorption column, said intermediate zone containing aqueous nitric acid of concentration at least equal to that of aqueous nitric acid from step (f);

(i) introducing at the top of said absorption column water in such amount that the ratio by weight of said water to ammonia oxidized in step (a) does not exceed 2.7;

(j) passing the mixture of residual gases and air of step (g) through said absorption column countercurrent to a descending flow of aqueous nitric acid formed by contacting in mass-exchange relationship said mixture of gases with said aqueous nitric acid, the pressure in said column being about 60 to 90 p.s.i.g.;

(k) removing strong nitric acid from the lower zone of said absorption column.

References Cited
UNITED STATES PATENTS

| | | | |
|---|---|---|---|
| 1,735,342 | 11/1929 | Taylor et al. | 23—162 |
| 2,046,162 | 6/1936 | Handforth et al. | 23—160 |
| 2,761,761 | 9/1956 | Congdon et al. | 23—160 |
| 3,136,602 | 6/1964 | Berger | 23—162 |

OSCAR R. VERTIZ, *Primary Examiner.*

B. H. LEVENSON, *Assistant Examiner.*